United States Patent
Emery et al.

(10) Patent No.: US 6,237,075 B1
(45) Date of Patent: May 22, 2001

(54) SYSTEM AND METHOD FOR GENERATING PSEUDO-RANDOM CODES

(75) Inventors: David L. Emery; Pierre Henri Michel Abbat, both of Charlotte, NC (US)

(73) Assignee: Pan Atlantic Corporation, Charlotte, NC (US)

(*) Notice: Subject to any disclaimer, the term of this patent is extended or adjusted under 35 U.S.C. 154(b) by 0 days.

(21) Appl. No.: 09/527,197

(22) Filed: Mar. 17, 2000

Related U.S. Application Data

(63) Continuation-in-part of application No. 09/037,494, filed on Mar. 10, 1998, now Pat. No. 6,079,007.

(51) Int. Cl.[7] .................................................. G06F 12/00
(52) U.S. Cl. ...................... 711/217; 711/218; 711/220; 711/212
(58) Field of Search .................................... 711/217, 218, 711/220, 167, 171, 212; 365/230.08, 230.01, 189.05; 712/208, 228, 243; 375/202, 367, 200, 206; 341/173; 714/775

(56) References Cited

U.S. PATENT DOCUMENTS

| | | | |
|---|---|---|---|
| 4,550,431 | * 10/1985 | Werth et al. | 382/226 |
| 4,723,246 | * 2/1988 | Weldon, Jr. | 714/775 |
| 4,755,969 | * 7/1988 | Pappas | 365/189.05 |
| 4,791,594 | * 12/1988 | Harney et al. | 708/254 |
| 5,400,359 | * 3/1995 | Hikoso et al. | 375/202 |
| 5,436,935 | * 7/1995 | Bernhard et al. | 375/367 |
| 5,438,596 | * 8/1995 | Sugita | 375/200 |
| 5,491,718 | 2/1996 | Gould et al. | 375/205 |
| 5,504,787 | * 4/1996 | Zscheile, Jr. et al. | 375/367 |
| 5,519,736 | * 5/1996 | Ishida | 375/367 |
| 5,532,695 | * 7/1996 | Park et al. | 341/173 |
| 5,648,982 | * 7/1997 | Durrant et al. | 375/206 |
| 5,682,605 | * 10/1997 | Salter | 375/200 |
| 6,079,007 | * 6/2000 | Emery et al. | 711/217 |

* cited by examiner

*Primary Examiner*—Matthew Kim
*Assistant Examiner*—Brian R. Peugh
(74) *Attorney, Agent, or Firm*—Withrow & Terranova, P.L.L.C.

(57) ABSTRACT

The invention provides a volatile or non-volatile memory and a latching circuit wherein data held in a first memory location is used to address the next memory location, in addition to providing a synchronous portion of the code. Accordingly, the data at the next memory address is used as a succeeding address and a subsequent portion of the code. The data is organized to repeat when the data stored in the address location is equal to the starting address.

25 Claims, 6 Drawing Sheets

| CODE SELECT | ADDRESS HEX | DATA HEX | CODE SEQUENCE FROM LSB (Q0) BINARY | CODE SEQUENCE FROM NEXT TO LSB (Q1) BINARY |
|---|---|---|---|---|
| 0 | A<br>1<br>0<br>C<br>7<br>9<br>F<br>2<br>D<br>3<br>4<br>5<br>8<br>E<br>B<br>6 | 1<br>0<br>C<br>7<br>9<br>F<br>2<br>D<br>3<br>4<br>5<br>8<br>E<br>B<br>6<br>A | 1<br>0<br>0<br>1<br>1<br>1<br>0<br>1<br>1<br>0<br>1<br>0<br>0<br>1<br>0<br>0 | 0<br>0<br>0<br>1<br>0<br>1<br>1<br>0<br>1<br>0<br>0<br>0<br>1<br>1<br>1<br>1 |
| 1 | 9<br>7<br>C<br>0<br>1<br>A<br>6<br>B<br>E<br>8<br>5<br>4<br>3<br>D<br>2<br>F | 7<br>C<br>0<br>1<br>A<br>6<br>B<br>E<br>8<br>5<br>4<br>3<br>D<br>2<br>F<br>9 | 1<br>0<br>0<br>1<br>0<br>0<br>1<br>0<br>0<br>1<br>0<br>1<br>1<br>0<br>1<br>1 | 1<br>0<br>0<br>0<br>1<br>1<br>1<br>1<br>0<br>0<br>0<br>1<br>0<br>1<br>1<br>0 |

SYSTEM AND METHOD FOR GENERATING PSEUDO-RANDOM CODES

This is a continuation-in-part application, based on U.S. application Ser. No. 09/037,494, filed Mar. 10, 1998, U.S. Pat. No. 6,079,007. The present invention relates to a system and method for generating codes and, in particular, a system and method for generating pseudo-random or arbitrary codes using primarily memory and latch circuitry.

BACKGROUND OF THE INVENTION

Code generators are used in many areas of electronics. The most common generators consist of a serial-input, parallel-output shift register with selected outputs being exclusive-or'd and fed back to the data input of the shift register. These codes are limited and only minimally arbitrary and provide no flexibility for selecting alternative codes or varying phases of one code. These drawbacks are exacerbated, since most of these circuits are hardwired.

As noted, most code generators of this type are restricted to a single code. A primary concern with code generators is avoiding loading all zeros in the code generator; thereby, causing the code generator to cease operation. These types of code generators are often used to generate maximal-length linear codes for direct sequence spread spectrum communication systems. They may be used to test communication lines and as building blocks in stream ciphers. These codes are typically equal to $2^{N-1}$, where N is equal to the number of shift registers. As an example, an 8 bit shift register is capable of generating one of 16 possible 255-bit codes. The code is a function of the selected feedback outputs.

Random access memory (RAM) and read-only memory (ROM) have been used to store arbitrary codes and they are immune to situations resulting in the shift register having all zeros. Typically, the memory is addressed by an address counter, which must be reset at the end of the code. Resetting this counter requires a means to determine that the end of the code has been reached and means to reset the address counter accordingly. Furthermore, a data latch is required to latch the data from the memory to avoid an erroneous output due to settling after inputs to the address line are changed. Since most memory provides a parallel eight-bit wide data output and the required code is serial, most memory-based code generators either output eight different codes simultaneously, which requires further logic to select the required code, or store eight bits of the code per byte, which requires circuitry adapted to load the eight bits into a parallel-input to serial-output shift register and clock the register contents serially. The latter configuration requires two clocks running at different frequencies. As is easily seen, such a circuit becomes very complex and expensive due to the large number of circuit elements.

Thus, there is a need for an inexpensive way to generate any required pseudo-random or arbitrary code. The means should avoid ceasing operation due to an all-zero condition in the shift registers and avoid requiring an address counter to access the code. Furthermore, there is a need for a means to generate and select multiple codes and/or different phases thereof in a simple and inexpensive manner.

SUMMARY OF THE INVENTION

The present invention eliminates all of the undesired features of the above systems and provides an inexpensive solution requiring only two components and a clocking signal. The invention provides either random access or a read-only memory and a latching circuit wherein data held in a first memory location is used to address the next memory location, in addition to providing a synchronous portion of the code.

Accordingly, the data at the next memory address is used as a succeeding address and a subsequent portion of the code. The data is organized to repeat when the data stored in the address location is equal to the starting address. Accordingly, the present invention provides a pseudo-random code generator including a memory having multiple uniquely addressable memory locations, address inputs for selecting any one of the memory locations, and data outputs providing data stored in an addressed memory location. Latch circuitry is included and adapted to provide a latch output of a latch input upon receiving a clock signal. At least part of the data output is coupled to a latch input, and at least part of the latch output is coupled to the address input. A portion of the data from any one memory location latched at the last output represents at least part of an address for an immediately succeeding one of said memory locations to be addressed and a portion of a pseudo-random code. When the latching circuitry is continuously clocked, at least part of an address for the immediately succeeding memory location and a pseudo-random code is formed from a portion of the latched outputs.

The pseudo-random code may be provided by at least one of the latched outputs wherein each latched bit at the corresponding latch output is one bit of the pseudo-random code. Each portion or bit may also represent one bit of different codes or different phases of the same code. Preferably, the data is configured to provide pseudo-random codes in a maximal length linear code format for use in spread spectrum communications.

These and other aspects of the present invention will become apparent to those skilled in the art after a reading of the following description of the preferred embodiments when considered in conjunction with the drawings.

BRIEF DESCRIPTION OF THE DRAWINGS

FIG. 3 is a table of data as stored in an addressable data structure according to the present invention.

DETAILED DESCRIPTION OF THE PREFERRED EMBODIMENT

Figure 1A:
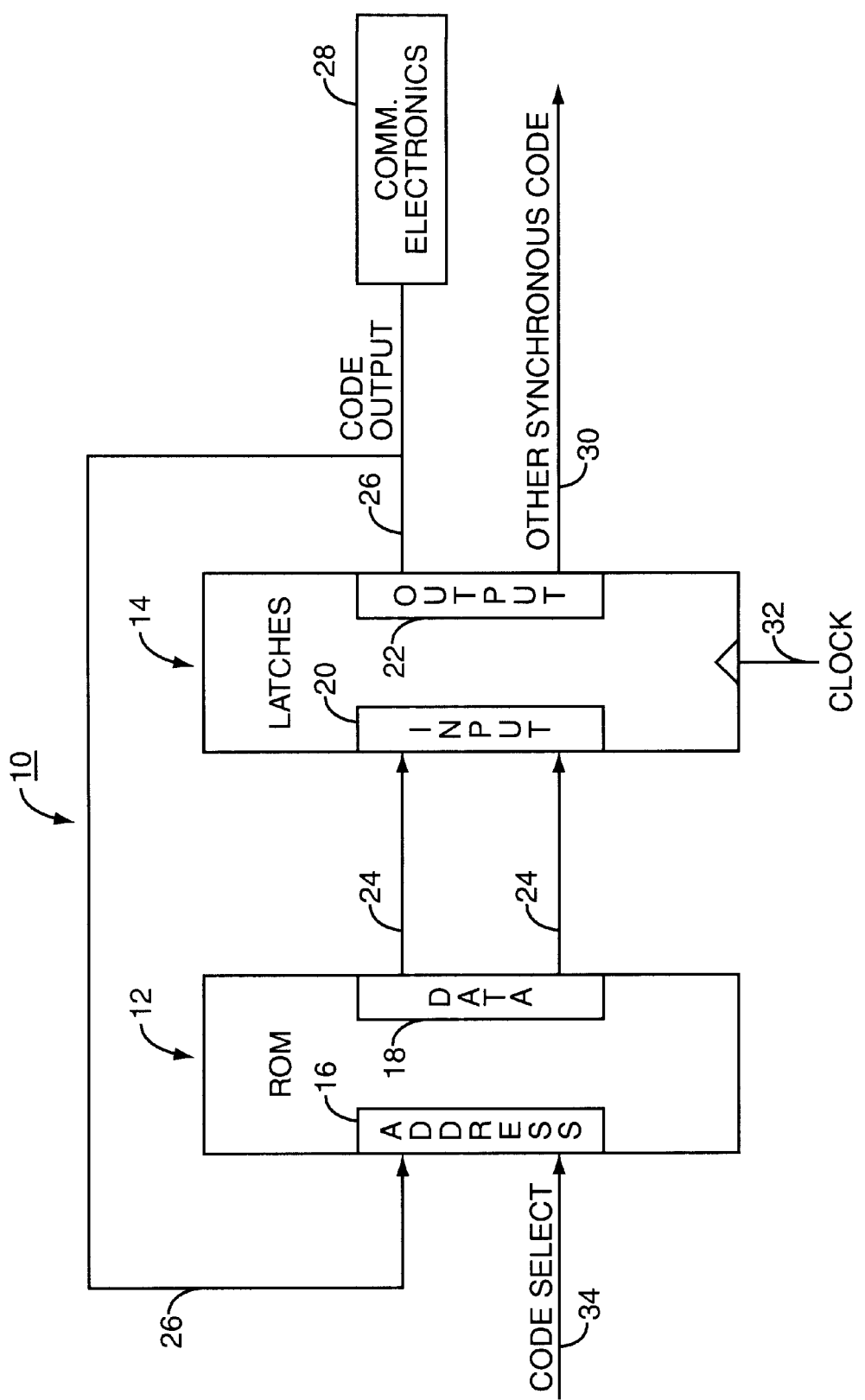
FIG. 1A is a schematic representation of a first code generator circuit embodiment constructed according to the present invention.

In the following description, like referenced characters designate like or corresponding parts throughout the several views. Referring now to the drawings in general, and FIGS. 1A through 1C in particular, it will be understood that the illustrations are for the purpose of describing preferred embodiments of the invention and are not intended to limit the invention thereto.

As best seen in FIG. 1A, the code generator circuitry, generally designated 10, is shown constructed according to the present invention. The code generator circuitry 10 includes two primary elements; a memory 12, such as a read-only memory (ROM), and latch circuitry 14. The memory 12 includes a plurality of memory locations addressable using address input 16 and adapted to provide data stored in these locations at data output 18 when properly addressed. The data outputs 18 of memory 12 are coupled to latch inputs 20 via data lines 24.

The data appearing on data lines 24 and latch input 20 is latched or held at data output 22 when the latch circuitry receives a clock signal on line 32. Preferably, the latch outputs 22 are coupled to corresponding ones of the least significant bits (LSB) of the address input 16 via the lower address lines 26. The remaining address bits may be used to select various codes stored in different sections of memory or groups of memory locations, which are generally addressable by the most significant address bits using the upper address lines 34. The latch circuitry 14 is preferably clocked using a dedicated clock signal from a clock circuit or a data output from additional control circuitry.

Figure 1B:
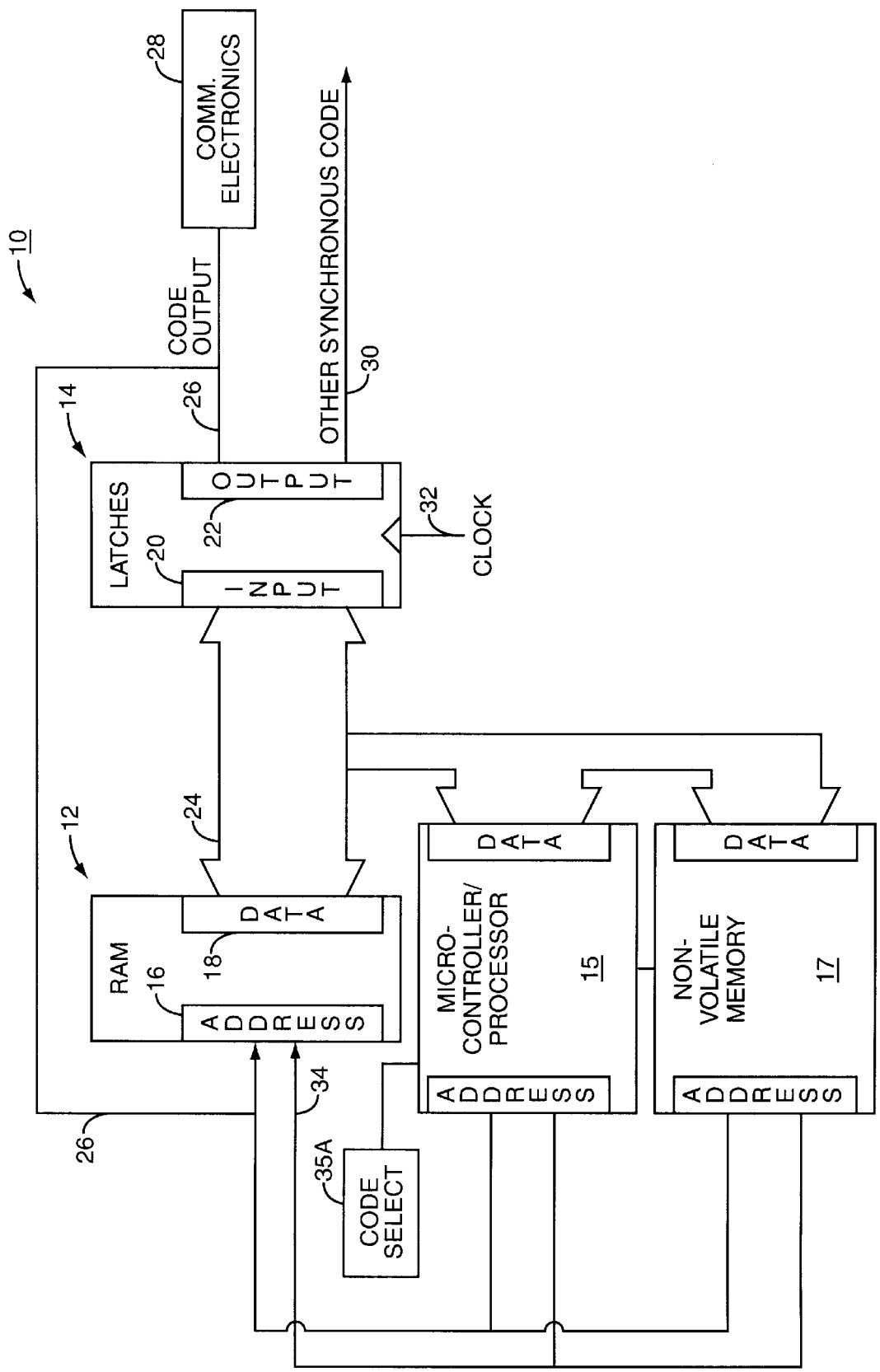
FIG. 1B is a schematic representation of a second code generator circuit embodiment constructed according to the present invention.
Figure 1C:
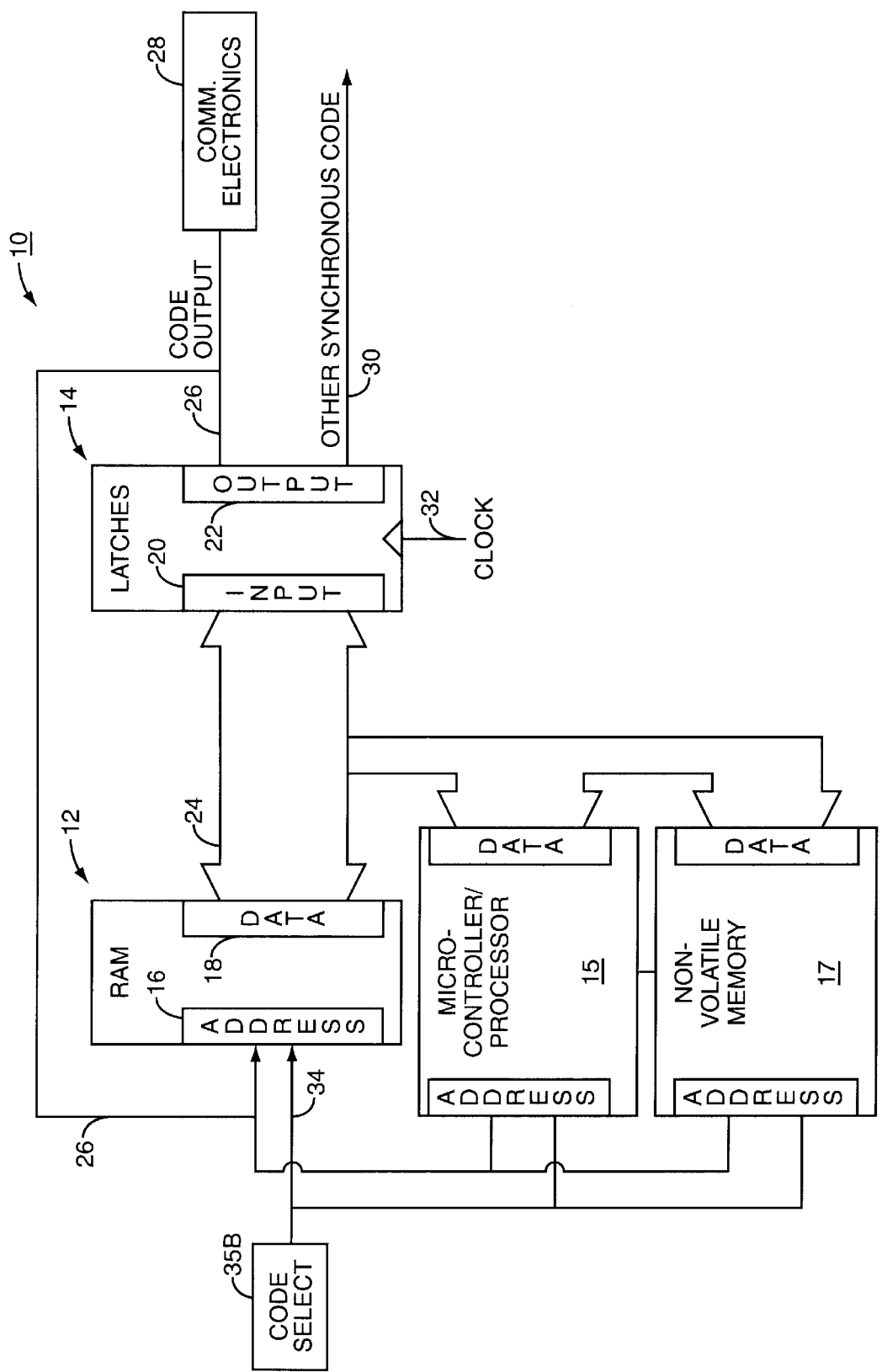
FIG. 1C is a schematic representation of a third code generator circuit embodiment constructed according to the present invention.

Alternatively, the memory may include volatile or random access memory (RAM) as depicted in FIGS. 1B and 1C. Using random access memory 12, requires loading the memory with any necessary data for operation during start-up. Typically, a microcontroller 15 will access a separate, non-volatile memory 17 that stores the codes necessary for operation and loads these codes into random access memory 12. Once the microcontroller 15 has loaded the random access memory 12, with the desired codes, the operation of a RAM-based code generator is identical to a ROM-based code generator. The use of random access memory is preferable in that such memory is typically cheaper and provides faster operation, and thus allows faster chip rates. One possible advantage of using a RAM-based code generator is that the code generator can be remotely loaded with new or additional codes via a communications link, such as a wireless, radio communication link.

The codes are stored in the memory in such a way that each location contains the address of the next location to be addressed. For a linear feedback shift register (LFSR), this is simply the result of shifting the word and applying exclusive-or's to the outputs to generate a bit to shift in. Address location zero should contain some other value in order to prevent the generator from continuously shifting in zero and sticking in a zero state. For a de-Bruijn sequence, the same process used for the LFSR is used, except that byte 80 hex (for an eight-bit register) contains 00 hex, and byte 00 hex contains 01 hex, thus including all 256 possible values. Notably, the ROM may be used to store any code, as long as the number of ones or zeros in the sequence does not exceed half the space addressable by the data or address bus width, whichever is smaller.

Multiple codes may be stored in the same memory in one of two ways. If codes are to be generated at different times, they may be placed in different address ranges on the chip. For example, 00-FF hex may be allocated for one code, while 100-1FF hex is allocated for the next code, and so on. Thus, the data provided to the latch for each address location will include at least part of the address for the immediately succeeding address location in the sequence and a portion of the code output.

If two different codes of the same length must be generated simultaneously, one bit per word may be allocated to the secondary code. The rest of the bits for that word are allocated to the primary code and feedback addressing. Additionally, other synchronous codes or code phases may be provided on the non-feedback lines 30, which do not provide addressing for the next memory location to be addressed. The primary code output may be provided on the non-feedback lines 30, but is preferably provided on one or more of the latch outputs 22 coupled to the feedback lines 26 wherein the one or more bits of the subsequent address provides corresponding bits for the code sequence. The code sequence is preferably output to communication electronics 28 and used to spread communication signals according to known spread spectrum communication techniques.

Figure 2:
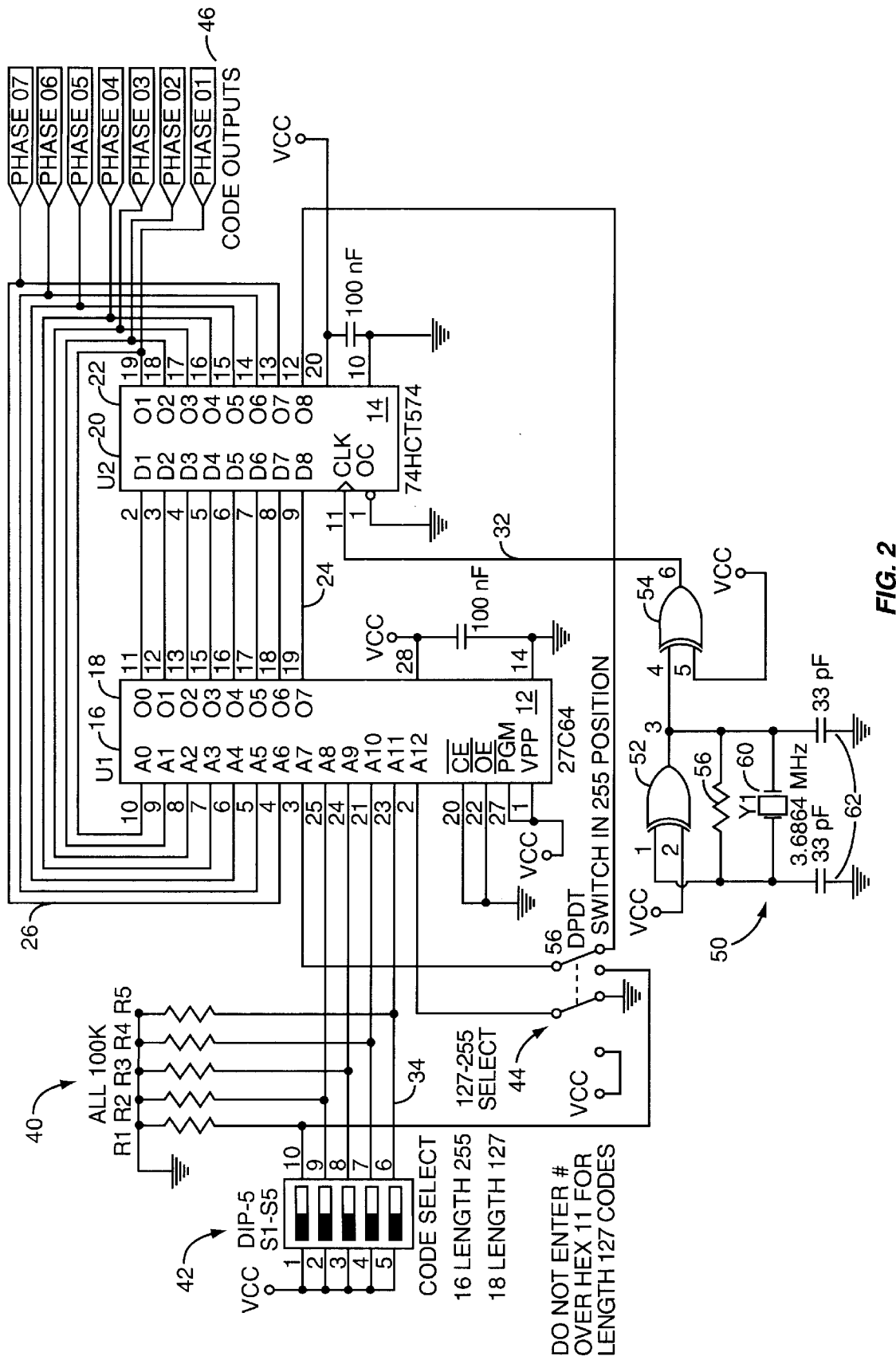
FIG. 2 is a detailed schematic of a pseudo-random code generator constructed according to the present invention.

A more detailed schematic of the preferred embodiment is shown in FIG. 2. As depicted, memory 12, also referenced as U1, is shown coupled to latch circuitry 14, also referenced as U2. Memory 12 is shown as a 28 pin, 64 kilobit memory having data configured in 8-bit words at each memory location. The latch circuitry 14 is preferably a standard octal D-type flip-flop (74HCT574), having eight data input lines, individually referenced as D1–D8, and latch outputs 22, individually referenced as Q1–Q8. Similarly, memory 12 includes eight data outputs 18, individually referenced as O0–O7, and thirteen address inputs 16, individually referenced as A0–A12. Notably, each component input or output throughout the schematic includes standard pin numbers for each integrated circuit or discrete component. As noted above, memory 12 may be volatile or non-volatile memory.

In the configuration shown, the data outputs 18 for memory 12 are directly coupled to the latch inputs 20 of latch circuitry 14. The latch outputs 22 are directly coupled to the corresponding eight least significant bits of the address lines 16 (A0–A7). Notably, latch output Q8 is coupled to address line A7 of memory 12 through the double-pole double-throw switch 44, also referenced as S6. In this position, data sequences retrieved from any one latch output may be 256 bits in length. If address line 87 is coupled to switch 1 of DIP-switch 42, the positioning of switch 1 may provide selection between one of two 127-bit codes at any one latch output 22. This provides a total of 32 codes, which is more than enough to store the 18 LFSR codes that preferably exist.

Assuming the pole of switch 44 coupled to address line A7 provides feedback from latch output Q8, DIP-switch 42 and one pole of switch 44 are coupled to address line A12 and may be configured to select any one of 16 ($2^4$) possible memory segments therein. In each of these segments, the data stored in each location will provide the next succeeding 8-bit address throughout the selected memory segment. Additionally, the latch outputs are also tapped to provide code outputs 46 wherein the bits for the next succeeding address and the current bit for any one of the code outputs are the same. The data may be configured so that each code output provides a different code or one or more phases of the same code.

In operation, DIP-switch 42 is set to select the desired memory segment in cooperation with the DPDT switch 44. The DPDT switch 44 will also control whether the code length can be a max of 128 bits in length or 256 bits in length by limiting the addressable length of the corresponding memory segment. The address lines coupled to DIP-switch 42 are pulled down to ground using a 100 kilo-ohm resistor pack, referenced as R1–R5. The opposite side of DIP-switch 42 is connected to the $V_{CC}$, which is preferably 5 volts.

Clock circuitry 50 is provided using a 3.6864 megahertz crystal oscillator 60 in cooperation with a resistor 56, capacitors 62, and exclusive OR gates 52,54. The exclusive OR gates operate to shape the clock signal 32 provided to the clock input of the latching circuitry 14. With each clock signal, data from a corresponding address memory location appears on the data output lines 18 and propagates to the latch inputs 20. As the latch circuitry 14 is clocked, the data appearing on data lines 24 and at the input of the latch circuitry 14 is latched and held on the latch outputs 22. Any one or all of these latch output lines Q1–Q8 may be tapped to provide a corresponding code sequence. Each time the latching circuitry 14 is clocked, a new bit is provided on each of the latch outputs 22.

In addition to providing a bit for any corresponding code sequence at the code outputs 46, the bit is fed back to a corresponding one of the eight lowermost address lines 26 (A0–A7) to address the next memory location for the sequence in the segments selected by the DIP-switches 42. Thus, the data held in a currently addressed memory location is used as all or part of an address for the next memory location. The data at that location will be used as yet another address wherein the code repeats when the data in an addressed location equals the starting address. The code sequence for any type of code may be part of the address or used in bits associated with the data not used for addressing.

As shown in FIG. 1B, the address lines for selecting respective codes by controlling the address to various memory segments may be controlled with a microcontroller 15 or other control system having an output coupled to the address lines and configured to select the desired memory segments. In such an embodiment, microcontroller 15 may be associated with a code selector 35A which is configured to provide a signal to the microcontroller 15 to select the proper code. In such case, the code selector 35A performs the function of the DIP-switches 42 and switches 44 and 56. Alternatively, in a ROM-based code generator system, the manual code selection as described an association with FIG. 2 is also possible. As shown in FIG. 1C, a manual code selector 35B may be used to select various codes as described above. The microcontroller 15 and non-volatile memory 17 are primarily used only to load memory 12 with the pertinent codes, and code selection is directly controlled by switches or the like within code selector 35B.

The table of FIG. 3 is exemplary of how data may be stored in memory 12 to allow selection of different code sequences, wherein each selection provides at least two simultaneous code sequences during operation. In the example, there are two selectable memory segments designated 0 and 1. Each segment includes 16 addressable memory locations addressable by a 4-bit nybble. The data in each location is also a 4-bit nybble wherein the address for a memory location and the data in that location are represented in hexadecimal for simplicity. Thus, each 4-bit address or data value will be a single, hexadecimal digit. The code sequences are provided at the two least significant bits of a latch output 22, referenced as Q0 and Q1, which also correspond to the least significant bits of the data in the currently addressed location and the address of the next location to be addressed. These bits are shown in binary for clarity.

As shown in the table, the data for any corresponding address represents the address for the next location to be addressed, and the least significant bits correspond to the data at the corresponding latched outputs Q0 and Q1. When the code select equals 0, the code sequence for the least significant bit is "1001110110100100," and the code sequence for the next to the least significant bit, Q1, is "11010001111." These codes will continuously repeat since the data of the last address location in the code sequence is address for the memory location holding the first bit of the code sequence.

Figure 4:
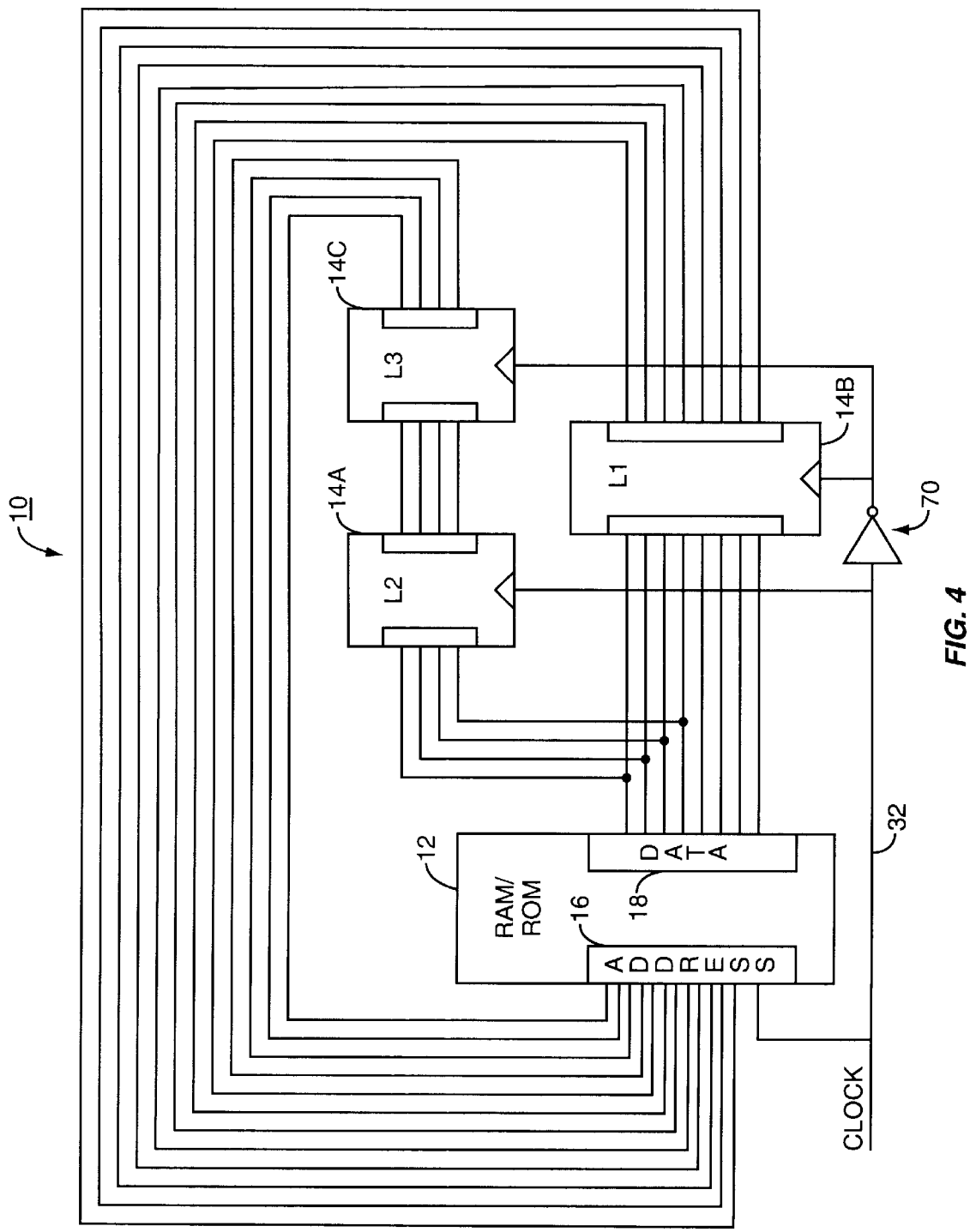
FIG. 4 is a schematic of an alternative embodiment of a code generator constructed according to the present invention.

As seen in FIG. 4, it is possible to generate codes longer than 256 bits with an 8-bit data structure by using more than one latch. For example, to generate a 4,095-bit code, 8-bit databytes in the memory may be configured as follows:

| Address | Data | Address | Data | Address | Data | Address | Data |
|---------|------|---------|------|---------|------|---------|------|
| 0000 | xx | 0800 | 53 | 1000 | 0x | 1800 | 00 |
| 0001 | 02 | 0801 | 51 | 1001 | 00 | 1801 | 00 |
| 0002 | 04 | 0802 | 57 | 1002 | 00 | 1802 | 00 |
| 0003 | 06 | 0803 | 55 | 1003 | 00 | 1803 | 00 |
| 0004 | 08 | 0804 | 5b | 1004 | 00 | 1804 | 00 |
| 0005 | 0a | 0805 | 59 | 1005 | 00 | 1805 | 00 |
| 0006 | 0c | 0806 | 5f | 1006 | 00 | 1806 | 00 |
| 0007 | 0e | 0807 | 5d | 1007 | 00 | 1807 | 00 |

As shown in FIG. 4, the lower half of the data output is coupled to both latches 14A and 14B. The upper half of the data output 18 is coupled directly to latch circuitry 14B. The output of latch circuitry 14A is coupled to another latch circuitry 14C. The latch outputs of 14C provide addressing for the four least significant address inputs 16, while the latch outputs of 14B are coupled to the eight most significant address inputs 16. A clock signal 32 is provided to the most significant bit of the address input 16, the clock input of latch circuitry 14A and inverter 70. The inverted clock signal, or the output of the inverter 70, is provided to latch curcuitry 14B and 14C. In operation, the least significant four bits of the data which have the most significant four bits of the 12-bit address are latched first at latch circuitry 14A, and then fed to the latch input of 14C. The inverted clock signal will clock latch circuitry 14B and 14C in order to provide address changes simultaneously. Thus, the lower half of the data at address N and N+1000 hex are latched by both latch circuitry 14A and latch circuitry 14B.

The circuit of FIG. 4 provides a way to simulate a 12-bit data bus with only eight bits. The top four bits are stored at addresses 1000-1fff and the bottom eight at 0000-0fff. The clock signal selects the top nybble or bottom byte and holds each in its proper latch. The table above should be continued to show that the byte in 1000-1fff does change. At 1080 it is 01, at 1100 it is 02, etc. The byte 0080 rolls over to 00. The numbers at 0800-0fff are the numbers at 0000-07ff exclusive-or'd with 53; the numbers at 1800-1fff are the same as at 1000-17ff, except that the number at 1000 and 0000 should not be zero. The table shows the LFSR (12, 11, 8, 6, 0) in Galois configuration. This is a well-known notation for LFSR's and means that the bits at times n+0, n+6, n+8, n+11, and n+12 will always exclusive-or to zero no matter what n is.

If a number from one to four were in the tap set, the numbers at 1800-1fff would not be the same as at 1000-17ff. There are two ways to implement an LFSR: Fibonacci and Galois. In a Fibonacci configuration, the table would be:

```
xxx
003
004
007
008
00b
00c
```

```
00f
011
012
015
016
019
01a
01d
01e
```

That is, the address is doubled, then the parity of bits 12, 6, 4 and 1 is put in bit 0, and the result is the data. In a Galois configuration, the address is doubled, and if bit 12 is 1, bits 6, 4, 1, and 0 are flipped. In both methods, bit 12 is discarded.

A Fibonacci configuration produces bits rippling from one end of the data bus to the other. A Galois configuration produces bits from widely separated code phases simultaneously. The code from the Galois LFSR is in the reverse order from that produced by the Fibonacci LFSR. The Galois LFSR is therefore denoted by (12, 11, 8, 6, 0), while the Fibonacci LFSR is denoted by (12, 6, 4, 1, 0).

Although the present invention has been described with preferred embodiments, it is to be understood that modifications and variations may be used without departing from the spirit and scope of the claimed invention, as those skilled in the art will readily understand. Such modifications and variations are considered within the purview and scope of the appended claims and their equivalents.

What is claimed is:

1. A sequence generator comprising:
   a. a memory having a plurality of uniquely addressable memory locations, address inputs for selecting any one of said memory locations and data outputs providing data stored in an addressed memory location;
   b. latch circuitry providing a latched output of a latch input upon receiving a clock signal, at least part of said data output coupled to said latch input and at least part of said latched output coupled to said address inputs; and
   c. a portion of said data from any one memory location latched at said latched output representing at least part of an address for an immediately succeeding one of said memory locations to be addressed and a sequence of bits wherein continuous clocking of the latch circuitry provides at least part of an address for the immediately succeeding memory location and a sequence of bits formed from a portion of said latched outputs.

2. The sequence generator of claim 1 wherein said sequence of bits is provided by one of said latch outputs and represents at least a portion of a pseudo random code.

3. The sequence generator of claim 1 wherein said data further represents a plurality of sequences of bits.

4. The sequence generator of claim 3 wherein said plurality of sequences of bits are provided by individual ones of said latch outputs and represent at least a portion of pseudo random codes.

5. The sequence generator of claim 1 wherein said data further represents different phases of said sequences of bits.

6. The sequence generator of claim 5 wherein said portions of said different phases are provided by individual ones of said latch outputs and represent one bit of said phases.

7. The sequence generator of claim 2 wherein said data is configured so that said pseudo-random code is a maximal length linear code adapted to provide PN-codes for a spread spectrum communication system.

8. A sequence generator comprising:
   a. a memory having addressable memory locations, a plurality of address inputs for selecting any one of said memory locations and a plurality of parallel data outputs configured to provide data corresponding to the addressed memory location;
   b. said data in each said memory locations configured to provide a portion of an immediately succeeding address location to be addressed and one bit of a sequence of bits;
   c. latching circuitry having a plurality of latch inputs coupled to said data outputs and a plurality of latch outputs coupled to a first group of said address inputs, said latching circuitry configured to latch data at said latch inputs to said latch outputs upon receiving a clock signal, wherein continuous clocking of the latch circuitry provides an address for the immediately succeeding memory location and one bit of a sequence of bits.

9. The sequence generator of claim 8 wherein said bit for forming said sequence of bits also forms part of the immediately succeeding address location.

10. The sequence generator of claim 8 wherein said data in said memory is configured to provide a sequence of bits for a plurality of memory sections, at least one said address input other than those of said first group coupled to selection circuitry configured to select one of said memory sections, said data in each said memory section configured to provide addressing within each memory section.

11. The sequence generator of claim 10 wherein said selection circuitry provides a data stream configured to select one said sequence of bits.

12. The sequence generator of claim 10 wherein said selection circuitry is a switch configured to select one said sequence of bits.

13. The sequence generator of claim 8 wherein said data in each location provides a plurality of bits corresponding to a plurality of sequences of pseudo-random code sequences.

14. The sequence generator of claim 13 wherein said portions of said bits for said plurality of pseudo-random code sequences are provided by individual ones of said latch outputs and represent one bit of said pseudo random codes.

15. The sequence generator of claim 13 wherein certain ones of said plurality of bits for any one of said memory locations represent a different phase of a one of said pseudo-random code.

16. The sequence generator of claim 13 wherein certain ones of said plurality of bits for any one of said memory locations represent one bit of a unique pseudo-random code.

17. The sequence generator of claim 8 wherein said data in each memory location is configured to provide a bit for an additional synchronous output at said data output.

18. The sequence generator of claim 17 wherein said data output associated with said additional synchronous output does not form part of an address.

19. A device for generating sequences of bits comprising a memory means and a latch means wherein select data outputs of said memory means are connected to an input of said latch means and an output of said latch means is connected to select address inputs of said memory means and changes upon receipt of a clock signal to generate a sequence of bits.

20. The device of claim 19 wherein select ones of said address inputs of said memory means not connected to the output of said delaying means are used to select one of several sequences of bits.

21. The device of claim 19 wherein data in said memory means are so arranged that each bit of the data output of said memory means, except the lowest-numbered, is always the same as the next lower-numbered bit was before said clock signal was applied.

22. The device of claim 19 wherein select ones of the data inputs of said memory means not connected to the input of said latch means are used to output one or more other sequences of bits synchronously to the sequences of bits output on the data lines of said memory means which are connected to said input of said latch means.

23. The device of claim 19 wherein said memory means is a read only memory (ROM).

24. The device of claim 19 wherein said memory means is a random access memory (RAM).

25. A device for generating sequences of bits comprising a memory means and more than one latch means wherein select data outputs of said memory means are connected to inputs of said latch means and outputs of said latch means changing to said inputs of said latch means upon the application of clock signals, said outputs and at least one or more of the clock signals of which are connected to select address inputs of said memory means.

* * * * *